July 10, 1951     G. A. D. TOUVET     2,559,688
ABSORPTION SPECTROMETRY WITH USE OF RADIO
FREQUENCY MODULATED LIGHT SOURCE
Filed July 24, 1947     2 Sheets—Sheet 1
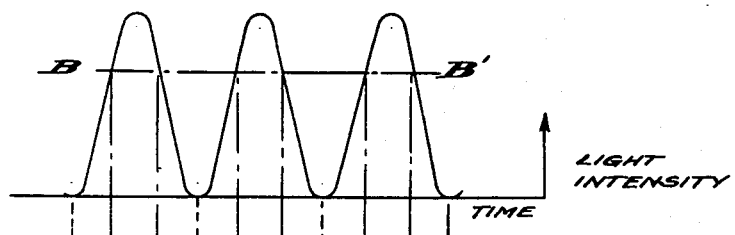
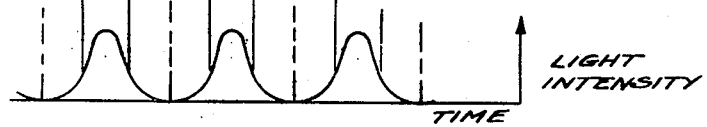
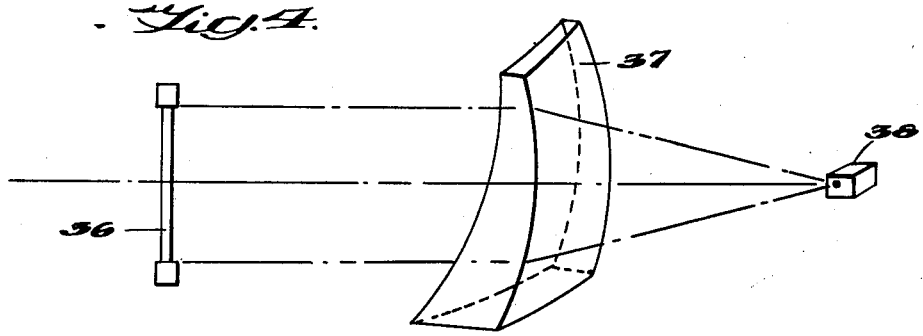
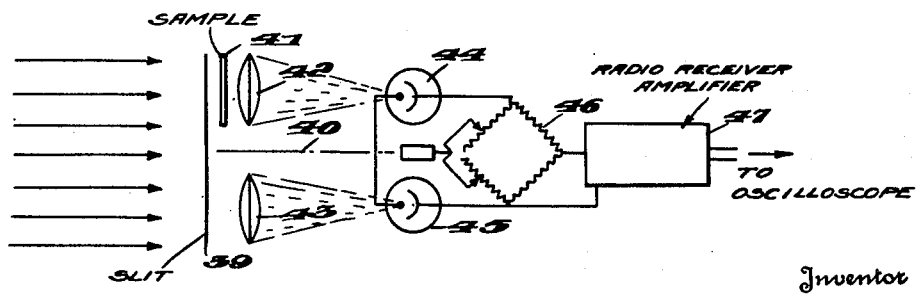
Inventor
GUY A. D. TOUVET

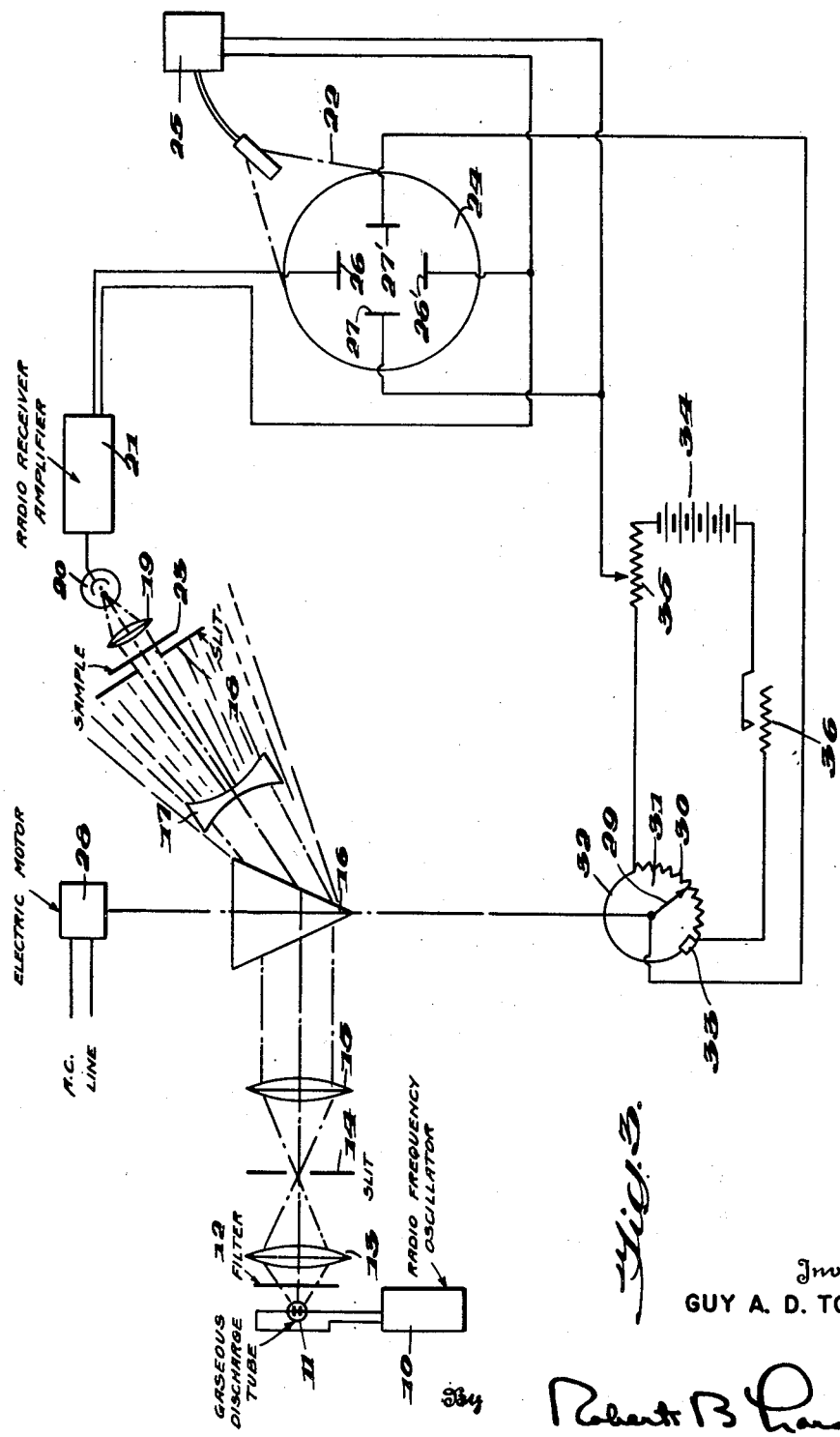

Patented July 10, 1951

2,559,688

UNITED STATES PATENT OFFICE 2,559,688

ABSORPTION SPECTROMETRY WITH USE OF RADIO-FREQUENCY MODULATED LIGHT SOURCE

Guy A. D. Touvet, Orleans, France

Application July 24, 1947, Serial No. 763,349

20 Claims. (Cl. 88—14)

This invention relates to spectrometers adapted to provide indirect visual observation of the spectrum by electronic means, and more particularly to such a spectrometer as will provide instantaneous observation of the absorption spectrum curve of a sample of substance. Spectrometers designed in accordance with the invention give the shape of this curve for a part of the light spectrum so as to provide for a qualitative and quantitative study of the spectrum. Moreover, they are especially utilizable for analysis in the invisible part of the light spectrum.

The invention departs in many respects from prior known spectrometers. In the first place the light source is a gas or vapor tube excited in radio frequency, so as to deliver a band of light of high level intensity in pulses of light, as will be explained presently. The light from the source so excited passes through an optical system which may comprise a convex lens, a slit and another lens or lenses, the system forming in effect a collimator by which the light from the slit is rendered parallel before it strikes a prism or the like. The prism comprises a part of a dispersing system, which may include other lens or lenses whose purpose is to cause the beam coming from the prism to diverge or spread.

A second slit is placed in the path of the beam, the purpose of the dispersing system and slit being to produce an enlarged image of the spectrum so that the second slit can isolate a part of the beam which passes therethrough to a photoelectric light sensitive element. The photoelectric element is connected to the amplifier of a radio receiver which directly feeds a cathode ray oscilloscope.

The transparent substance to be analyzed, which may be solid or liquid, is disposed in the path of the beam of parallel light before it reaches the prism, or it may be positioned at other points in the system as will be later described.

A separation of the spectrum on the screen of the oscilloscope corresponds to a given difference in wave lengths. This is usually referred to as linear dispersion and in the apparatus is provided by the horizontal displacement given to the spot on the cathode ray tube screen by electronic controls in the system.

Perpendicular displacement of the spot of the cathode ray oscilloscope, that is of the beam of the scope is correlated to the angular position of the prism by mechanical and electrical means in such manner that the displacement of the spot is a function of the position of the prism as it rotates. One pair of plates in the oscilloscope is electrically controlled depending on such position while the other pair of plates in the oscilloscope is affected by the output of the amplifier i. e. a radio frequency receiver.

The different output signals of the amplifier i. e. of the radio receiver, are thus computed on the cathode ray oscilloscope and appear on its screen in the form of a curve which is the exact curve of absorption of the sample which is being analyzed for a spread band of light radiation. In other words, the measurement is made of the light absorbed and emitted or transmitted at different wave lengths by the material under test. Electronic means being used, the response is instantaneous, and the shape of the curve is immediately and automatically registered.

It is a general object of the invention to provide a spectrometer which so functions. These and other objects and advantages of the invention will become more apparent from the following description and claims when read in conjunction with the accompanying drawings in which:

Figs. 1 and 2 are graphs illustrating wave forms;

Fig. 3 is a diagrammatic representation of one system for carrying out the invention;

Fig. 4 is a diagrammatic representation of means for transforming the non-point light source into a form approximating a point source, and Fig. 5 is a diagrammatic representation of another system in accordance with the invention.

Before describing one or more specific embodiments of the invention, some specific remarks should be directed to the use which the invention makes of light which has been modulated by radio frequency. It has already been intimated that the light source employed may be a gas or vapor tube. When such light source is one or more of the rare gases such as xenon, helium, neon, or krypton at low pressure in an electrical discharge tube, and such, in accordance with the invention, is energized with radio frequency, such radio frequency excitation causes an increase in radiation in some particular portion of the spectrum depending on the gas and frequency in use. Moreover, it broadens the line spectrum into a band spectrum; enhances the radiation of lines which are of very low amplitude with conventional excitation; and permits greater electric current densities in the tube with the resulting increased light power output and without distortion or overloading of the modulation.

Such a method of producing light with enhanced radiation properties as referred to above has been described in my copending application, Serial No. 645,626, filed February 5, 1946, now Patent No. 2,538,062, issued January 16, 1951, to which reference may be made. Such method takes advantage of the ionization of the gas or vapor by induction produced by the exciting current itself. It is of course apparent that the shape of the tube, the wave form and the intensity of the exciting current are all important factors.

It seems clear that the gas molecules are accelerated and that there is an increase and decrease in acceleration during a radio frequency cycle of excitation (or a part of such cycle if the excitation is class C). In theory, the electrons are very probably submitted to a certain action during excitation, the result being a redistribution of energy in the spectrum and the enlargement of certain rays of the spectrum into a band of light. The emission is enhanced in a certain part of the spectrum and it is possible to localize greater energy in a definite light band, thus resulting in a notable increase of the tube efficiency for a certain wave length.

Consequently, in accordance with the invention it is possible to produce a well defined band of light in a very precise part of the spectrum, even in the long infra-red part of the spectrum. Filtering the band of light to obtain only a desired light frequency or band of light frequencies, if necessary, and spreading of the band's spectrum, thus becomes easier.

When a substance is being examined with a spectrometer made in accordance with the invention, the transparency of that substance to the light which has been excited by radio frequency gives a different sensitivity of measurement than if a constant level light had been used because the radio frequency excited light generally provides a peak and varies in intensity during a cycle. With such light passing through the substance being examined, and depending upon its characteristics, a clear variation in amplitude or intensity is not obtained as if the light were cut along the line B—B of Fig. 1 to obtain discrete intermittent pulses of light. Instead it takes the shape illustrated diagrammatically in Fig. 2. With an ordinary direct constant level light, the result can only correspond to a constant lower level due to absorption of the light of the constant amplitude light source.

In other words, with the present invention, the transparency is obtained for a series of different values of intensity during a radio frequency cycle of excitation of the light source. The intensity peaks can be made high if necessary, but a more sensitive effect is obtained because not only is the maximum peak reduced (as would be a constant level light) but also because below a certain value during the cycle, the absorption is so completely effective that it can be said to reach the point during each cycle where no more light is transmitted through the substance. It is possible to compare this level with the maximum amplitude of the radio frequency excited light which comes out of the sample, such measurement being easy and accurate, being the amplitude of a radio frequency carrier.

Another advantage of using such light is that generally a constant peak amplitude of radiation is obtained for a small portion of the spectrum. The light source employed, however, results in a band of light between well defined wave lengths, the shape of which band is known. Any portion of the spectrum can be observed, or successive portions one after the other. The observation of the infra-red spectrum is most interesting.

One system for carrying out the invention is diagrammatically illustrated in Fig. 3. It includes a radio frequency oscillator 10 operating at a radio frequency F and connected to excite a gas or vapor tube 11. The tube 11 preferably is a gaseous discharge tube containing a rare gas such as xenon, helium, neon, or krypton at low pressure, although other gases or vapors may be employed as referred to in my copending application. As previously mentioned such radio frequency excitation causes an increase in radiation in some particular portion of the spectrum depending on the gas and frequency used. A filter 12 may be placed in front of the light source, if desired, to cut out undesirable light and restrict the light even more definitely to the particular portion of the spectrum with which it is desired to work.

The light from the source is passed through an optical system comprising, for example, a convex lens 13, which is adapted to concentrate the light on the slit 14 which is placed in the focal plane of a lens 15. The lens 15 (or a system of lenses) receives the light from the slit 14 and gives it the form of a parallel beam. The lens 13, the slit 14, and the lens 15, form in effect a collimator by which the light from the slit is rendered parallel by the lens 15 before striking a prism 16.

The prism 16 comprises a dispersing system which is adapted to spread the band of light which it intercepts. Instead of a prism, a diffraction grating may be used, as is known in the art. Depending on how the dispersing system is constituted and utilized, in certain cases it will be found that it will not be necessary to employ the filter 12 at all.

The invention employs a divergent lens or a system of lenses 17 to cause a still greater spreading or divergence of the beam of light which emerges from the prism 16. The purpose of such further divergence is to produce an enlarged image of that portion of the spectrum so that a second slit 18 can isolate only a small beam or part thereof. The small beam which passes through the slit 18 strikes a lens 19 which converges the small beam on a light sensitive element such as the photoelectric cell 20. The photo-electric cell 20 is, as indicated, placed in the focal plane of the complex optical system just described. It is connected to the amplifier 21 of a radio receiver, which amplifies the output of the photo-electric cell 20 and feeds it directly to a cathode ray oscilloscope 22.

The output of the photo-electric cell 20 is in terms of radio frequency and can be tuned to the main frequency F of the exciting current of the gas tube 11, or to a multiple frequency of this main frequency, that is to an harmonic of the main frequency. Preferably the amplifier 21 should be tuned on one harmonic of the frequency F so as to avoid direct pick-up from the oscillator 10. The invention employs a radio frequency carrier in case of very slow variations of the amplitude of the light which is picked up by the photo-electric cell 20, and thus the amplification is made easier and more stable. This should be extremely difficult with ordinary light in which case it would be necessary to utilize a direct current amplifier. In case of variations of extremely short duration (absorption ray) affecting the light which is picked up by the photoelectric cell, the response depends only on the frequency response of the radio frequency receiver 21.

The substance to be analyzed which may be an inorganic or organic solid or liquid, is interposed in the path of the beam of parallel light before it reaches the prism 16, or it may be disposed in place of the filter 12, or as shown in Fig. 3, it may be between the slit 18 and the converging lens 19, where it is indicated by the reference numeral 23.

The cathode ray oscilloscope 22 may be of the usual type which is comprised of a vacuum tube one end of which, called the screen 24, is painted on the inside with a fluorescent material. A current of electrons flows from the negative terminal of the tube past a grid in a straight beam toward the fluorescent screen. When the beam strikes the screen, it excites the fluorescent material, producing a spot of light. The required supply for the tube 22 is indicated in the drawings (Fig. 3) by the reference numeral 25.

The cathode ray oscilloscope 22 is also fitted with two pairs of parallel plates 26, 26', and 27, 27', as is usual, for applying mutually perpendicular transverse electrical fields to the cathode ray beam. Since the deflections of the bright spot on the fluorescent screen due to these two fields are at right angles to each other, it is possible to cause the spot to trace any desired curve by applying suitably varying potentials to the two sets of plates 26, 26' and 27, 27'. In the present instance varying potentials are applied to the two sets of plates so that the spot is caused to trace the absorption spectrum curve of the sample of substance being examined.

To obtain displacement of the spot of the oscilloscope so as to cause it to trace the curve as referred to above, the prism 16 is mechanically coupled to an electric motor 28, which for example, turns at twenty-four revolutions per second. The motor 28, the prism 16, and a rotating contact 29 on a variable resistance 30 connected in a potentiometer 31, may all be disposed on a common axis so that the prism 16 and the contact 29 are driven by the motor 28 at the same speed as the motor. In other words, the prism 16 and the contact 29 should both be rotated by the motor 28 at the same speed as the motor. The potentiometer 31 includes the resistance 30, a flat surface 32, and an insulated portion 33, all disposed in a circle and all adapted to be contacted by the rotating contact 29 as the latter revolves.

The resistance 30 and the flat surface contact 32 are fed by a direct current source, such as the battery 34, through a second potentiometer 35. The other end of the resistance 30 is connected with the battery 34 through a variable resistance 36.

As will be noted from Fig. 3, one of the plates 27' of the pair 27, 27' of the oscilloscope 22 is connected directly with the rotating contact 29, while the other plate 27 of this pair is connected to the potentiometer 35. The other pair of plates 26, 26' of the oscilloscope 22 is connected to receive the output from the radio receiver 21.

The potentiometer 35 permits adjustment of the spot of the oscilloscope to a zero position. The variable resistance 36 in the circuit of the battery 34 and value of the potentiometers 31 and 35, permits variation of the amount of the displacement of the spot as a function of the position of the contact 29. The position of the rotating contact 29 (which corresponds with the angular position of the prism 16) thus determines the position of the spot in one direction while the output of the amplifier 21 determines the position of the spot in the other direction. The flat contact 32 over which the contact 29 rides in engagement therewith, allows the spot to remain in the same position at the end of one exploration of the spectrum. The little insulated portion 33 (or in lieu thereof a very high resistance) permits the contact 29 to move the spot back to the starting point after one exploration.

A synchronous motor could be employed to synchronize the sweep of the cathode ray oscilloscope. The speed of the motor being for example 1440 R. P. M., twenty-four explorations of the spectrum (that is, of the desired part of it) are made each second. A steady curve is obtained on the screen which corresponds to twenty-four pictures per second. If the dispersing system is a prism, as here shown, it can be arranged that each of the three sides of the revolving prism 16 will correspond to successive explorations of the spectrum.

With respect to the speed of the motor 28, it should be clear that if the screen of the oscilloscope has a certain remanance or retentivity, it will not be necessary to have twenty-four explorations per second. Depending on the remanance, ten or even less explorations per second might be sufficient without any flickering. The image being a non-moving one, a steady curve and better luminosity can sometimes be obtained with a smaller number of images per second.

Perhaps certain additional remarks should be directed to the tuning of the amplifier 21. This RF amplifier can be tuned on the same frequency F of the oscillator 10, or on a multiple of the frequency F. The oscillator 10 should be designed so as to have as few harmonics as possible, when the RF amplifier 21 is to be tuned on one harmonic due to the shape of the light emitted. For this purpose the radio circuit (tank circuits of the oscillator 10) is provided with as big a capacity as possible to reduce the impedance for harmonics and their amplitude. Consequently the chances of direct pick-up by the amplifier 21 are reduced. This is naturally irrespective of the most careful shielding which of course should be used.

Generally, it is best not to connect the ground connection of the amplifier 21 with the ground connection of the oscillator 10. On the contrary, it is better to provide the most elaborate radio frequency insulation of one with respect to the other. With respect to the frequency to which the amplifier 21 should be tuned, it depends on how the gas tube 11 is excited and in this connection reference may be made to my copending application Serial No. 645,626, filed February 5, 1946.

Since they are of main importance, some remarks will be directed to the dispersion and to the resolving power of the apparatus which has been described. The theoretical resolving power is dependent mainly on the dispersion and on the characteristics of the dispersion system. The practical resolving power which corresponds to spectral purity and intensity depends on the width of the first slit 14. As described, the invention has found it useful to increase the practical resolving power, by disposing a second slit (the slit 18) in front of the photoelectric cell 20, or more exactly in the path of the divergent optical system which directs the beam to the second slit. Extremely small fields can thus be obtained for the electrical exploration of the spectrum.

Purity is generally at the most twenty percent less than the theoretical resolving power (maximum). Divergence of the divergent optical in front of the second slit and opening width of the second slit (which is about ten times the opening of the first slit) are arranged so that they correspond at least to the theoretical maximum resolving power. Then there is no diminution in spectral purity, but an improvement.

It is realized that the gaseous discharge tube is a non-point source of light, although special shapes of tubing may be used to make the light more similar to that which would come from a point source. In accordance with one phase of the invention, the light emitted from the gas tube may, however, be transformed into practically a point source. Such an arrangement is illustrated in Fig. 4 diagrammatically. In this figure, the gas tube 36 is disposed in front of a distorting optical system 37, the form, construction and position of which are such that the rays emitted by the tube and falling on the said optical system 37 are focussed into an image, which is approximately a point image 38 and which is produced at a determined point. The form of the optical system and its position control can be so designed that the image 38 has practically the same dimensions as to width and height. Thus all the luminous flux emitted by the gaseous discharge tube which falls on the deforming optical system is focussed and good brilliancy is obtained at point 38. This image 38 can, for example, be positioned in the system illustrated in Fig. 3, at the same point where the gaseous tube 11 is positioned in that figure. The use of such an arrangement will, it will now be evident, improve the results of the system. It is understood that any skilled person in the art will be able to construct such a distorting optical system and that consequently no detailed explanation thereof need be given here.

It should now be clear that spectrometers constructed in accordance with the present invention differ greatly from prior known spectrometers.

First of all there is use in the present invention of light from a gas tube which has been excited with radio frequency. The advantages of that have been referred to and should now be evident.

Secondly, spectrometers constructed in accordance with the present invention are different with respect to the manner of observation of the spectrum. As should now be evident, the system permits the detection, selectively, of the light radiation, the whole receiver being only sensitive to such emission of light. In other words, compared to other systems, the signal to noise ratio is increased and greater sensitivity is allowed. The response of the receiver for any kind of modulation of such radio frequency excited light can be extremely high, as high as in any normal radio receiver. As a result, amplification in radio frequency is utilized. Compared to other systems the present system obtains a considerably increased sensitivity, greater fidelity, and greater accuracy of the analysis of the transparency of a substance being examined for the light radiations of different wave lengths.

Thirdly, the present invention differs from prior systems in that, in addition to the dispersion of the light by optical elements, it effects a further spreading of the spectrum by electronic means by amplification of selected light frequencies varying in amplitude at radio-frequency and in such manner that such electronic spreading can be adjusted at will by control of the oscilloscope. Great enlargement of even very narrow bands of light, and continuous inspection of the spectrum can thus be obtained. The choice of the light band according to the substance being so examined, its dispersion, and the electrical spreading of the spectrum are some of the main points of importance. It should now be appreciated that the number of "accidents" of the absorption spectrum can be observed with this system when with other systems they are not even noticeable, and consequently more accurate observation can be made with the invention.

Fourthly, the present invention differs from other known systems in that it provides for visual observation on the screen of a cathode ray oscilloscope. The results, that is, the different output signals from the receiver-amplifier are computed on the oscilloscope and appear on its screen in the form of a curve which is the exact curve of absorption of the product which is being analysed for a spread band of light radiation. In other words, the measurement is made of the light absorbed and transmitted at different wave lengths by the material under test. Electronic means being used, the result is instantaneous, and the shape of the curve is immediately and automatically registered.

The identification of the lines on the screen is made by comparison with the spectra of known elements. Calibration of the screen and interpolation can be made. This comparison spectra can be the spectra of the source itself when the rays are rays which are easy to spot out.

Finally, for any wave length, visible or invisible, of the light spectrum, the absorption curve is obtained in visible form on the screen of the oscilloscope. This is especially interesting for the invisible part of the spectrum because it makes possible not only direct vision of an invisible part of the spectrum but also a photographing thereof. No plotting of absorption or transmission curve is necessary, but direct and instantaneous vision is attained.

With the present invention, up to the present time, it has been possible to realize in the infrared part of the spectrum, an inspection up to 9 $\mu$, and it is believed possible to go farther, if necessary even up to 15 $\mu$ with the proper type of gas tube, the proper type of gas, the correct radio frequency excitation, and adequate light sensitive elements replacing the (photoelectric cells).

The system described is only one simple sample of realization of the invention and now that the invention has been disclosed, other types of circuits and arrangements will be found possible of use. The schematic example illustrated and described has been chosen because it illustrates fairly well the fundamental operation of the invention.

It should now be evident that the invention can be very useful for certain types of chemical analysis, for qualitative examinations of material for purpose of identification; to test the presence or absence of specific constituents or impurities or essential or minor constituents of materials and also for quantitative analyses of the same.

In the medical field, the system is so sensitive that blood can be tested and compared. The apparatus can help to obtain an almost immediate diagnosis of the patient. The process by comparison to already tested and well established characteristic curves of reference should detect any intoxication of chemical order or inform of the presence of abnormal chemicals. Moreover, it can give a definite reply with respect to certain diseases which affect the blood and which give absorption curves of well defined shape (especially in the infra-red region of the spectrum).

Another type of system is disclosed in Fig. 5 which shows a system providing comparison of the light beam intensity without absorption and with absorption, the output being in relation with the proportion of both. This system can be useful when the peak of the intensity of the light produced by the source in the portion of the spectrum in which the observation is carried out, is not constant in the full band. Then a relative measurement is made in the following way. The light taken by the optical system from the same area of the source and after passing through a slit 39, is divided by a partition 40 into two beams. These are directed as two parallel beams and the sample 41 is placed in one of them. Both beams then pass through converging lenses 42, 43. The photoelectric cell 44 receives the attenuated beam, while the photoelectric cell 45 receives the non-attenuated beam.

These two identical photoelectric cells 44 and 45 feed an electrical bridge 46. A balanced adjustment allows the balancing of the two photoelectric cells so that they have the same sensitivity when receiving the same beam intensity. The output from the bridge 46 is fed to the amplifier 47 which may be similar to that used in the apparatus of Fig. 3. The amplified outputs are then conveyed to an oscilloscope in a manner similar to that of Fig. 3.

Sometimes it can be made interesting to cause the beam which is picked up by photoelectric cell 45 to first pass through a calibrated absorption sample or cell to match the other beam and to check the exact matching with the scope.

With such a system as illustrated in Fig. 5, in the case that radiation from the source is not constant throughout all the band explored, or in the case that response and sensitivity of the light sensitive photoelectric cells are not constant, it is easy to realize that correct proportion and measurement is obtained. Particular sensitivity of response of a photosensitive element for different wave lengths is cancelled out.

The system of Fig. 5 can also be useful when the absorption of a substance has to be compared to the absorption of a known substance. In this case as previously mentioned for calibrated absorption cell, one of the substances is placed in the path of the part of the beam which is picked up by photoelectric cell 45 and the other in the path of the part of the beam which is picked up by photoelectric cell 44. Relative absorption of one substance with respect to the other can then be determined.

Now that this embodiment has been disclosed many different types of circuits can be designed for connecting the two photoelectric cells and their amplifier to the oscilloscope.

When in the claims it is stated that the light is modulated at radio frequency, the term "light" is intended to include wave energy or radiation. As such it would include light which is not visible to the naked eye, such as infra-red and ultra-violet light. The reference to light varying in amplitude at radio frequency as used in the appended claims is intended to mean that the intensity of the light is periodically varied at a radio-frequency.

I claim:
1. A spectrometer comprising, a source of light amplitude modulated at a radio frequency to be passed through a sample whose absorbtion spectrum thereof is to be determined, a collimator disposed in the path of said light to transform it into parallel rays, a rotating prism disposed to intercept said parallel rays, a divergent lens disposed in the path of the light passing through said prism, a slit positioned to isolate a portion of said light coming from said divergent lens, a lens for converging said isolated portion, a photoelectric cell positioned to receive said converged light, and a radio receiver amplifier connected to receive the output from said photoelectric cell, the output of said photoelectric cell being tuned to the frequency of the exciting current for said source of light.

2. A spectrometer comprising, a source of light amplitude modulated at a radio frequency to be passed through a sample whose absorbtion spectrum thereof is to be determined, a collimator disposed in the path of said light to transform it into parallel rays, a rotating prism disposed to intercept said parallel rays, a divergent lens disposed in the path of the light passing through said prism, a slit positioned to isolate a portion of said light coming from said divergent lens, a lens for converging said isolated portion, a photoelectric cell positioned to receive said converged light, and a radio receiver amplifier connected to receive the output from said photoelectric cell, the output of said photoelectric cell being tuned to a harmonic of the frequency of the exciting current of said source of light.

3. A spectrometer comprising, a gaseous discharge tube, means for exciting said tube to modulate the light at radio frequency, a collimator disposed in the path of the light to transform it into parallel rays, a prism disposed to intercept said parallel rays, means for rotating said prism at constant speed, a divergent lens disposed in the path of the light emerging from said prism, a slit positioned to isolate a portion of said light coming from said divergent lens, a lens for converging said isolated portion, a photoelectric cell positioned to receive said converged light, a radio receiver amplifier connected to receive the output of said photoelectric cell, a cathode ray oscilloscope, means connecting the output of said amplifier to one pair of plates of the oscilloscope, an electric circuit connected to the other pair of plates of the oscilloscope, said electric circuit including a potentiometer and a sliding contact formed as a circle but insulated from each other at one point, a contact mounted to swing about said circle in contact with said potentiometer said sliding contact and said insulation point, said contact being rotated by said means for rotating said prism, a source of current for said circuit, said contact being connected to one of the plates of said last named pair, the other plate of said pair being connected into the circuit through a second potentiometer, whereby the sweep of the spot of the oscilloscope in one direction is in proportion to the angular displacement of said prism while the deviation of the spot in the other direction is in proportion to the intensity of the light impinging upon the photoelectric cell.

4. A spectrometer comprising, a gaseous discharge tube, means for exciting said tube to modulate the light at radio frequency, a collimator disposed in the path of the light to transform it into parallel rays, a prism disposed to intercept said parallel rays, means for rotating said prism, a divergent lens disposed in the path of the light emerging from said prism, a slit positioned to isolate a portion of said light coming from said divergent lens, a lens for converging said isolated portion, a photoelectric cell positioned to receive said converged light, a radio receiver amplifier connected to receive the output of said photoelectric cell, a cathode ray oscilloscope, means connecting the output of said amplifier to one pair of plates of the oscilloscope, an electric circuit connected to the other pair of plates of the oscilloscope, said electric circuit including a potentiometer and a sliding contact formed as a circle but insulated from each other at one point, a contact mounted to swing about said circle in contact with said potentiometer said sliding contact and said insulation point, said contact being rotated by said means for rotating said prism, a source of current for said circuit, said contact being connected to one of the plates of said last named pair, the other plate of said pair being connected into the circuit through a second potentiometer, whereby the sweep of the spot of the oscilloscope in one direction is in proportion to the angular displacement of said prism while the deviation of the spot in the other direction is in proportion to the intensity of the light impinging upon the photoelectric cell, said circuit having a variable resistance therein between the source of current and said first potentiometer.

5. A spectrometer for examining a transparent substance comprising, a gaseous discharge tube, means for exciting said tube at radio frequency to cause emission of a band of radio frequency amplitude modulated light, means for selecting a substantially monochromatic portion of said light, means for passing said substantially monochromatic light through the transparent substance, a photosensitive device for receiving light passing through said substance and for converting said light to electrical energy, and tunable means for amplifying said electrical energy at a radio frequency which is a whole number multiple of the frequency of the exciting current for said gaseous discharge tube.

6. An absorption spectrometer including a gaseous discharge tube light source, means for exciting said tube with radio frequency current to cause emission of a band of light amplitude modulated at radio frequency, optical means for transforming the light from said tube into a point source and direct portions of the band of light through a substance to be examined and transparent thereto, an optical dispersing system positioned to receive light from said source, a light sensitive element positioned to receive light from said dispersing system to convert said light into radio-frequency current having amplitude variations at a frequency corresponding to said radio-frequency amplitude modulated light and varying in amplitude intensities for the different light frequencies of the band of light in accordance with the characteristic absorption spectrum of the substance, and radio frequency means for amplifying the current output of said light sensitive element.

7. Absorption spectrometer apparatus comprising a source of substantially monochromatic light amplitude modulated at radio frequency, a pair of photo-electric cells positioned to receive said light, a bridge network connected to the radio-frequency current outputs of said cells, means for adjusting said network to give a predetermined radio-frequency current output from the bridge when said cells receive the same light amplitude intensity, a radio frequency amplifier receiving the output of said network, and means for interposing a test sample in the path of the light reaching the first of said cells, whereby said network may become unbalanced and the output of the amplifier is changed in accordance with the characteristic absorption spectrum of the test sample.

8. Apparatus as set forth in claim 7, and means for interposing a standard material in the path of the light reaching the second of said cells, whereby the output of said amplifier provides an instantaneous indication of the relative absorptive properties of the test sample and the standard material.

9. Apparatus as set forth in claim 8, and means for producing from said amplifier output a single indication of the differences in the absorptions of the sample and the standard.

10. In a method of absorption spectrometry, the step of producing a band of light frequencies modulated to vary in amplitude at a radio frequency, dispersing said band of light frequencies, isolating a portion of said dispersed light, passing said isolated portion of light through a sample whose absorption spectrum is to be determined and indicating the amplitude of the radio-frequency modulated light passed through the sample whereby the varying amplitude intensities of the portions of light passed through the sample is characteristic of the absorption spectrum of the sample.

11. In a method of absorption spectrometry, the step of producing a band of light frequencies modulated to vary in amplitude at a radio frequency, dispersing said band of light frequencies, isolating a portion of said dispersed light, passing said isolated portion of light through a sample whose absorption spectrum is to be determined, detecting and converting the light passed through the sample into an electric signal varying in amplitude at the radio frequency and proportional in amplitude to the amplitude variations of the converted light, and indicating the amplitude variation of said electric signal, whereby the indicated amplitude variations are proportional to the amplitude variations of the converted light which are characteristic of the absorption spectrum of the sample.

12. In a method of absorption spectrometry, the step of producing a band of light frequencies modulated to vary in amplitude at a radio frequency, dispersing said band of light frequencies, isolating a portion of said dispersed light, passing said isolated portion of light through a sample whose absorption spectrum is to be determined, detecting and converting the light passed through the sample into an electric signal varying in amplitude at the radio frequency and proportional in amplitude to the amplitude variations of the converted light, amplifying said electric signal, and indicating the amplitude variation of said amplified electric signal, whereby the indicated amplitude variations are proportional to the amplitude variations of the converted light which are characteristic of the absorption spectrum of the sample.

13. In a method of absorption spectrometry, the step of producing a narrow band of light frequencies modulated to vary in amplitude at a radio frequency, passing said light through a sample whose absorption thereof is to be determined, detecting and converting the light passed through said sample to an electric signal having amplitude variations at the radio frequency and proportional to the amplitude variations of the converted light, and indicating the amplitude variations of said electric signal, whereby the indicated amplitude variations are proportional to the amplitude variations of the converted light which are characteristic of the absorption spectrum of the sample.

14. In a method of absorption spectrometry, the step of producing a narrow band of light frequencies modulated to vary in amplitude at a radio frequency, passing said light through a sample whoese absorption thereof is to be determined, detecting and converting the light passed through said sample to an electric signal having amplitude, variations at the radio frequency and proportional to the amplitude variations of the converted light, amplifying said electric signal, and indicating the amplitude variations of said amplified electric signal, whereby the indicated amplitude variations are proportional to the amplitude variations of the converted light which are characteristic of the absorption spectrum of the sample.

15. A method of absorption spectrometry analysis which comprises, passing a radio-frequency amplitude modulated band of light through a substance transparent thereto, detecting and converting the light which has passed through the substance to an electric current of radio-frequency having amplitude variations at a frequency corresponding to said radio-frequency modulation of the band of light and varying in amplitude intensities for the different light frequencies of the band of light in accordance with the characteristic absorption spectrum of the substance, whereby the absorption spectrum of the substance is indicated by amplitude variations of said radio-frequency current.

16. A method of absorption spectrometry analysis which comprises, passing a radio-frequency amplitude modulated band of light through a substance transparent thereto, detecting and converting the light which has passed through the substance to an electric current of radio-frequency having amplitude variations at a frequency corresponding to said radio-frequency modulation of the band of light and varying in amplitude intensities for the different light frequencies of the band of light in accordance with the characteristic absorption specrum of the substance, amplifying said radio-frequency current, whereby the absorption spectrum of the substance is indicated by amplitude variations of said amplified radio-frequency current.

17. A method of absorption spectrometry analysis which comprises, passing a radio-frequency amplitude modulated band of light having peaks of high light intensity reoccurring at the radio-frequency through a substance transparent thereto, detecting and converting the light which has passed through the substance to an electric current of radio-frequency having amplitude variations at a frequency corresponding to said radio-frequency modulation of the band of light and varying in amplitude intensities for the different light frequencies of the band of light in accordance with the characteristic absorption spectrum of the substance, whereby the absorption spectrum of the substance is indicated by amplitude variations of said radio-frequency current.

18. A method of absorption spectrometry analysis which comprises, exciting a gaseous discharge tube with radio-frequency currents of known shape and intensity to produce emission of a specific band of light radiation differing from the normal ray spectrum of the gas tube and having amplitude variations at radio-frequency, directing the light through a substance to be examined and transparent thereto, detecting and converting the light which has passed through the substance to an electric current of radio-frequency having amplitude variations at a frequency corresponding to said radio-frequency modulation of the band of light and varying in amplitude intensities for the different light frequencies of the band of light in accordance with the characteristic absorption spectrum of the substance, whereby the absorption spectrum of the substance is indicated by amplitude variations of said radio-frequency current.

19. A method of absorption spectrometry analysis which comprises, exciting a gaseous discharge tube with radio-frequency currents of known shape and intensity to produce emission of a specific band of light radiation differing from the normal ray spectrum of the gas tube and having amplitude variations at radio-frequency, directing the light through a substance to be examined and transparent thereto, detecting and converting the light which has passed through the substance to an electric current of radio-frequency having amplitude variations at a frequency corresponding to said radio-frequency modulation of the band of light and varying in amplitude intensities for the different light frequencies of the band of light in accordance with the characteristic absorption spectrum of the substance, whereby the absorption spectrum of the substance is indicated by amplitude variations of said radio-frequency current, said last mentioned amplified radio-frequency current having a frequency which is a whole number multiple of the frequency of the tube exciting current.

20. A method of absorption spectrometry analysis which comprises, exciting a gaseous discharge tube with radio-frequency currents of known shape and intensity to produce emission of a specific band of light radiation differing from the normal ray spectrum of the gas tube and having amplitude variations at radio-frequency, dispersing said resulting band of light, isolating a portion of said dispersed band of light, passing said portion through a substance to be examined and transparent thereto, detecting and converting the light which has passed through the substance to an electric current of radio-frequency having amplitude variations at a frequency corresponding to said radio-frequency modulation of the band of light and varying in amplitude intensities for the different light frequencies of the band of light in accordance with the characteristic absorption spectrum of the substance, whereby the absorption spectrum of the substance is indicated by amplitude variations of said radio-frequency current.

GUY A. D. TOUVET.

REFERENCES CITED

The following references are of record in the file of this patent:

UNITED STATES PATENTS

| Number | Name | Date |
| --- | --- | --- |
| 1,774,146 | Lasti | Aug. 26, 1930 |
| 1,829,634 | Chretien | Oct. 27, 1931 |
| 1,853,953 | Becker | Apr. 12, 1932 |
| 1,926,824 | Stogoff | Sept. 12, 1933 |

(Other references on following page)

UNITED STATES PATENTS

| Number | Name | Date |
|---|---|---|
| 1,960,097 | Barnard et al. | May 22, 1934 |
| 1,993,890 | Langer | Mar. 12, 1935 |
| 2,017,897 | Emersleben | Oct. 22, 1935 |
| 2,032,588 | Miller | Mar. 3, 1936 |
| 2,047,930 | Linder | July 14, 1936 |
| 2,130,077 | Dorgelo | Sept. 13, 1938 |
| 2,139,489 | Cockrell | Dec. 6, 1938 |
| 2,193,606 | Ulrey | Mar. 12, 1940 |
| 2,206,072 | Barthelemy | July 2, 1940 |
| 2,234,329 | Wolff | Mar. 11, 1941 |
| 2,240,722 | Snow | May 6, 1941 |
| 2,330,877 | Fleisher et al. | Oct. 5, 1943 |
| 2,333,762 | Bertrand | Nov. 9, 1943 |
| 2,336,550 | Kruper | Dec. 14, 1943 |
| 2,342,771 | Voight | Feb. 29, 1944 |
| 2,395,850 | Colman | Mar. 5, 1946 |
| 2,411,741 | Michaelson | Nov. 26, 1946 |
| 2,414,363 | Dietert et al. | Jan. 14, 1947 |
| 2,444,560 | Feldt et al. | July 6, 1948 |

FOREIGN PATENTS

| Number | Country | Date |
|---|---|---|
| 170,267 | Great Britain | Aug. 3, 1922 |

OTHER REFERENCES

Royal Society Proceedings (London)—1940—Series A—vol. 175—page 366—Article by Tolansky, et al.